Jan. 19, 1932. E. E. JONES 1,842,175
FURROWING MACHINE
Filed Dec. 26, 1930
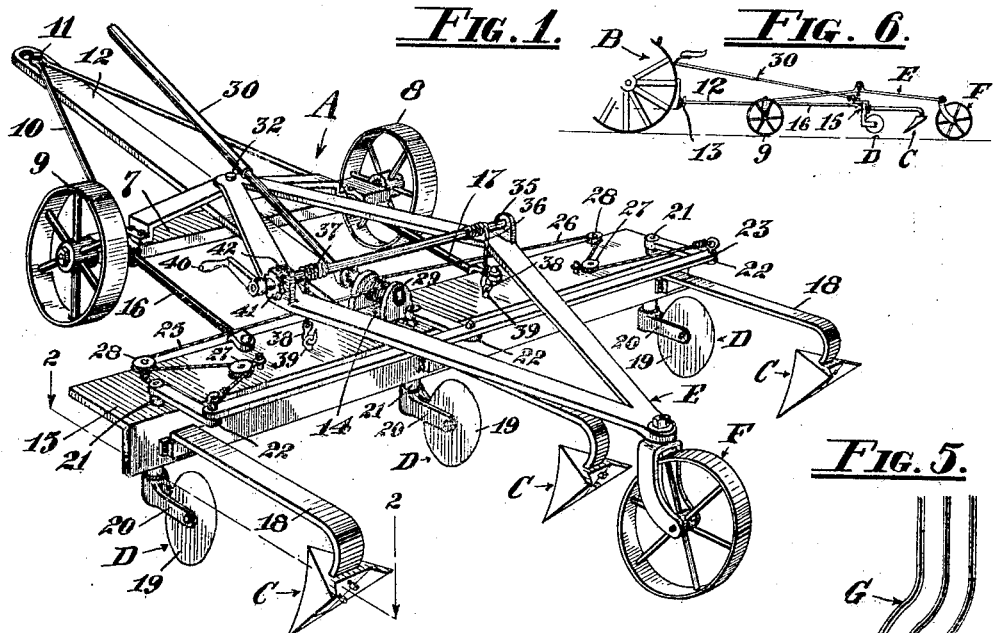
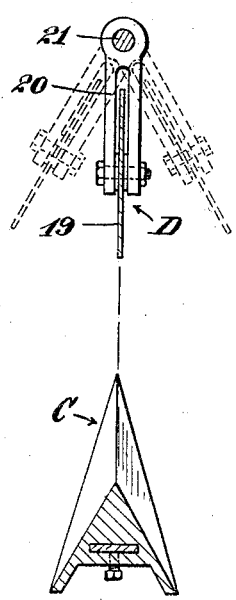
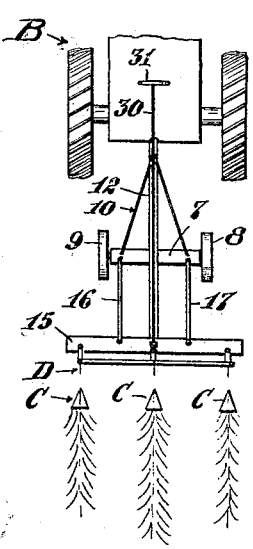
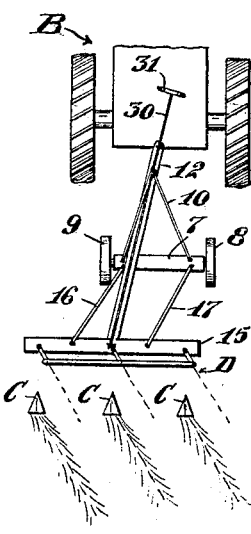
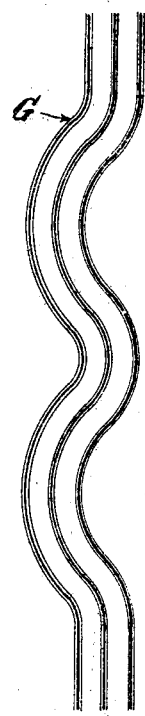
Inventor
Earl Elmer Jones.
By R. S. Berry
Attorney Patented Jan. 19, 1932

1,842,175

UNITED STATES PATENT OFFICE

EARL ELMER JONES, OF GLENDORA, CALIFORNIA

FURROWING MACHINE

Application filed December 26, 1930. Serial No. 504,835.

This invention relates to a furrowing machine and has as its primary object the provision of a machine which is especially applicable for use in forming furrows in orchard land for irrigation purposes; a particular object of the invention being to provide a furrowing machine which is adapted to form serpentine furrows under the control of an operator whereby the furrows may be formed to underlie the natural water shed of trees.

Another object is to provide a furrowing machine which is so constructed as to be operable to effect lateral movement of furrowing plows thereon while the machine is advancing, and in which the lateral movement of the plows is accomplished under the action of ground engaging rudders.

Another object is to provide a simple and effective means for effecting steering of a furrowing machine and whereby lateral movement of the furrowing machine may be controlled from a remote point, as from a tractor, by which the furrowing machine is towed.

With the foregoing objects in view together with such other objects and advantages as may subsequently appear the invention resides in the parts and in the combination, construction and arrangement of parts as hereinafter described and claimed, and illustrated by way of example in the accompanying drawings, in which:

Figure 1 is a perspective view of a furrowing machine.

Figure 2 is a detail in horizontal section taken on the line 2—2 of Figure 1.

Figures 3 and 4 are diagrammatic plan views illustrating the mode of operation of the machine.

Figure 5 is a diagram illustrating serpentine furrows which may be formed by the machine.

Figure 6 is a view of the furrowing machine as seen in side elevation with the furrowing plows out of operative relation to the ground.

Referring to the drawings more specifically, A indicates generally a wheeled carriage which embodies a frame 7 supported at its ends on a pair of wheels 8 and 9, and which frame is fitted with a yoke 10 pivotally connected at 11 to the forward end portion of a draw bar 12 adapted to be connected to the rear end of a tractor B, or other means of draft. The draw bar 12 extends rearwardly over the frame 7 and is adapted to swing transversely thereof on its pivoted connection 13 with the tractor. Pivotally connected at 14 to the rear end of the draw bar 12 is a plow carrying frame 15 which normally extends parallel with the frame 7 in spaced relation thereto and is connected to the latter by means of a pair of links 16 and 17. The frame 15 may be of any suitable construction but is here shown as formed of an angle iron.

In carrying out the present invention a plurality of furrowing plows C are carried on the frame 15, being here shown as attached to the latter by brackets 18 projecting rearwardly from the frame. The several furrowing plows C are disposed in transverse alignment on a plane extending parallel with the frame 15, and mounted for pivotal movement on the frame 15 is a series of coulters D each of which embodies a circular disk 19 carried on a yoke 20 affixed on the lower end of a vertically extending shaft 21 projecting upwardly through the frame 15 and journaled therein.

The coulters D are thus in the form of casters, and in carrying out the invention one of said coulters is positioned to normally extend in alignment with each of the furrowing plows C as shown in full lines in Figure 2.

The coulters D are spaced forwardly from the plows C and are positioned to engage the soil in advance of the plows and are designed to act as rudders to effect steering of the plows laterally as will be later described.

Means are provided for manually effecting swinging of the coulters relatively to the plows, which means is here shown as embodying arms 22 affixed to the upper ends of the shafts 21 to extend horizontally therefrom in a rearward direction, the several arms 22 being interconnected by a tie bar 23 whereby swinging movement of any one or more of said arms 22 will effect corresponding swinging movement of the other arms. The means here shown for swinging the arms 22 comprises a pair of cables 25 and 26 which are connected to the outer ends of the end arms 22 and are passed around direction rollers 27 and 28 and lead to a drum indicated at 29, on which the cables 25 and 26 are wound in opposite directions, the drum 29 being revolubly carried on the frame 15 and being here shown as connected to a telescoping shaft 30 leading to a hand wheel 31 located convenient to the reach of an operator riding the tractor B.

As a means for supporting the plows and coulters clear of the ground when not in use, a frame E is pivotally connected at its forward end to the frame 7 as indicated at 32 and is arranged to extend rearwardly over the frame 15 in spaced relation thereto, and mounted on the rear end of the frame E in alignment with the intermediate plow C is a caster wheel F, which wheel is arranged to traverse a furrow formed by the plow C in front thereof. Mounted on the frame E is a revoluble shaft 35 arranged to extend over the frame 15 in the general direction of the length thereof and wound on said shaft 35 are cables 36 and 37 fitted with hooks 38 adapted to be detachably engaged with eyes 39 on the frame 15. The shaft 35 is fitted with a crank 40 and has a ratchet wheel 41 engaged by a pawl 42 whereby the shaft 35 may be held against rotation.

In the operation of the invention, when it is desired to position the plows C and coulters D out of operative relation with the ground, the hooks 38 are engaged with the eyes 39 and the cables 36 and 37 are wound on the shaft 35 by rotating the latter thereby elevating the frame 15, the frame being held in its elevated position as shown in 36 by the pawl 42 engaging the ratchet 41. The machine may then be caused to traverse the ground without effecting a plowing action.

When it is desired to operate the plows the frame 15 is lowered through the medium of the shaft 35 and cables 36, whereupon on the plows and coulters being engaged with the soil the hooks 38 are detached from the frame 15 so that the latter may then swing laterally and move vertically independent of the frame E.

On advancing the machine the furrowing plows C will act to form furrows in the usual manner. When the coulters D are disposed in alignment with the plows as shown in full lines in Figure 2 the plows will form straight furrows as shown in Figure 3.

When it is desired to cause the furrowing plows to move laterally relatively to the carriage A while advancing, the coulters D are swung to the right or left as indicated in dotted lines in Figure 2, thereby presenting the disks 19 at an angle to the direction of advance of the carriage A, which by reason of the coulters being engaged with the soil will cause the latter to act as rudders resulting in shifting the frame 15 longitudinally to either one side or the other in a direction determined by the angular positions of the coulters; the frame 15 with the plow C moving sideways out of line with the carriage A as shown in Figure 4. The positioning of the coulters is effected through the medium of the drum 29 and the cables thereon, as by rotating the drum in one direction a pull will be exerted upon one of the cables 25 or 26 to swing the coulters in one direction, and on rotating the drum in the opposite direction a pull will be exerted on the other of the cables to swing the coulters in the opposite direction. In this manner the furrowing plows may be readily caused to traverse a serpentine path of travel thereby resulting in the formation of serpentine furrows G as indicated in Figure 5.

While I have shown and described a specific embodiment of my invention, I do not limit myself to the exact details of construction or to the particular arrangement shown, but may employ such changes and modifications of the parts as occasion may require without departing from the invention as defined in the accompanying claims.

I claim:

1. In a furrowing machine, a wheeled frame, a plow frame, link connections between said frames, a draw bar leading from said plow frame to a point forward of said wheeled frame, said draw bar being pivotally connected to said plow frame, a yoke pivoted to the forward end portion of said draw bar and attached to said wheeled frame, a plurality of furrowing plows on said plow frame, a revoluble disk arranged to engage the ground in front of each of said plows and in alignment therewith, vertical shafts carrying said disks journalled in said plow frame, and manually operated means for effecting simultaneous turning of said vertical shafts to cause said disks to swing laterally and thereby dispose same in various angles relatively to said plows.

2. In a furrowing machine, a plow frame, a series of furrowing plows thereon, a series of coulters pivotally mounted on said frame, there being a coulter arranged to engage the ground immediately in front of each of said plows, a draft appliance to which said frame is connected to swing laterally, and means for effecting positive swinging movement of said coulters collectively in opposition to the resistance afforded by the ground engaged thereby to cause said frame to shift laterally while the machine is advancing.

3. In a furrowing machine, a wheeled frame, a plow frame, link connections between said frames, furrowing plows on said plow frame, coulters mounted on said plow frame to swing laterally thereon, said coulters arranged to traverse the ground in preceding relation to said plows, manually controlled means for collectively swinging said coulters, a frame pivoted to said wheeled frame and extending over said plow frame, a caster wheel on said last named frame arranged to traverse the ground rearward of a plow on said plow frame, and means connecting said plow frame to said last named frame for raising and lowering said plow frame relative to the ground.

4. In a furrowing machine, a wheeled frame, a plow frame disposed rearward of said wheeled frame, links connecting said frames whereby said plow frame may be shifted transversely of the path of travel of said wheeled frame, a plurality of vertically disposed shafts carried on said plow frame and extending downwardly therefrom, a revoluble vertically disposed disk carried by each of said shafts, said disks being arranged to project into the ground, a series of furrowing plows affixed to said plow frame and arranged to engage the ground rearward of said disks, a reciprocal tie-rod extending longitudinally of said plow frame, an arm affixed to each of said shafts, the outer end of each of said arms being pivotally connected to said tie-rod, a revoluble drum on said plow frame, cables wound on said drum extending from opposite sides thereof and connecting with the ends of said tie-rod, manually operated means for turning said drum to effect movement of said tie-rod longitudinally of said frame and thereby swing said disks through the medium of said shafts, a draw-bar pivotally connected to said plow frame extending forwardly over said wheeled frame, and a yoke connecting said wheeled frame to the forward end portion of said draw-bar.

In witness whereof I hereunto affix my signature.

EARL ELMER JONES.